US012667058B2

(12) United States Patent
Brun et al.

(10) Patent No.: US 12,667,058 B2
(45) Date of Patent: Jun. 30, 2026

(54) SYSTEMS AND METHODS FOR MANAGING HORTICULTURAL LOAD SHEDDING

(71) Applicant: SOLLUM TECHNOLOGIES INC., Montreal (CA)

(72) Inventors: Louis Brun, Montreal (CA); Francois Roy-Moisan, Montreal (CA); Jacques Poirier, Montreal (CA); Gabriel Dupras, Montreal (CA); Marc Tremblay, Montreal (CA); Florence Longpre, Montreal (CA)

(73) Assignee: SOLLUM TECHNOLOGIES INC., Montreal (CA)

( * ) Notice: Subject to any disclaimer, the term of this patent is extended or adjusted under 35 U.S.C. 154(b) by 353 days.

(21) Appl. No.: 18/187,604

(22) Filed: Mar. 21, 2023

(65) Prior Publication Data
US 2023/0301248 A1     Sep. 28, 2023

Related U.S. Application Data

(60) Provisional application No. 63/269,805, filed on Mar. 23, 2022.

(51) Int. Cl.
*A01G 9/24* (2006.01)
*H05B 47/105* (2020.01)

(52) U.S. Cl.
CPC ........... *A01G 9/249* (2019.05); *H05B 47/105* (2020.01)

(58) Field of Classification Search
CPC .............................. H05B 47/105; A01G 9/249
See application file for complete search history.

(56) References Cited

U.S. PATENT DOCUMENTS

| | | | |
|---|---|---|---|
| 6,340,868 B1 | 1/2002 | Lys et al. | |
| 2019/0098723 A1 | 3/2019 | Sadwick | |
| 2024/0040972 A1* | 2/2024 | Krijn ..................... | H05B 47/105 |
| 2024/0266831 A1* | 8/2024 | Rajaraman .............. | H02J 3/003 |

FOREIGN PATENT DOCUMENTS

| | | |
|---|---|---|
| CA | 2732086 | 1/2010 |
| CN | 113962075 | 1/2022 |
| WO | 2008112181 | 9/2008 |
| WO | 2016119063 | 8/2016 |
| WO | 2021119674 | 6/2021 |

OTHER PUBLICATIONS

European Patent Office, European Search Report dated Sep. 14, 2023 in Application No. 23163545.9.

* cited by examiner

*Primary Examiner* — Mark A Connolly
(74) *Attorney, Agent, or Firm* — SNELL & WILMER L.L.P.

(57) ABSTRACT

The present techniques generally concern techniques for managing horticultural load shedding. A system includes a plurality of horticultural light sources powered by an electrical utility, the plurality of horticultural light sources being disposed in a horticultural structure to irradiate at least one plant or crop; a control module in data communication with the electrical utility, the control module being adapted to receive information associated with at least one load shedding event and, in response thereto, produce a control signal; and a rendering module adapted to receive and process the control signal; and send illumination instructions to the plurality of horticultural light sources to adjust an emission profile of the plurality of horticultural light, thereby mitigating potentially negative effects on said at least one plant or crop growth. A method is also provided.

19 Claims, 12 Drawing Sheets

SYSTEMS AND METHODS FOR MANAGING HORTICULTURAL LOAD SHEDDING

CROSS REFERENCE TO RELATED APPLICATIONS

This application claims priority to and the benefit of U.S. Provisional Patent Application Ser. No. 63/269,805, filed on Mar. 23, 2022 entitled "SYSTEMS AND METHODS FOR MANAGING HORTICULTURAL LOAD SHEDDING". The aforementioned application is hereby incorporated by reference herein in its entirety for all purposes.

TECHNICAL FIELD

The technical field generally relates to horticultural lighting, and more particularly concerns systems and methods for managing horticultural load shedding.

BACKGROUND

Artificial light sources may be used in horticulture or agriculture to assist or promote the growth of plants or crops, which may be particularly useful in a horticultural structure such as a greenhouse.

The horticultural structures are generally equipped with a plurality of horticultural lighting apparatuses connected to an electrical grid. The operation of the horticultural light sources may have undesired impacts on the electrical grid. For example, horticultural structures may consume a significant quantity of electricity at moments or periods during which electrical power may be required for other applications such as, for example, individuals' needs. These impacts are typically monitored and controlled by the electrical utility.

There remains a need for systems and methods that can provide improvements in methods and systems for controlling horticultural lighting sources in the context of electrical load shedding.

SUMMARY

The present techniques generally concern systems and methods for managing horticultural load shedding. Horticultural load shedding may potentially have a negative impact on crops or plants growth. The techniques provided herein include an architecture enabling load-balancing, preventive mitigation and/or palliative mitigation of electrical utility load shedding events for horticultural lighting or horticultural light sources, which may be disposed across multiple sites, but may be operated within a same electrical utility network. The techniques described herein allow reducing, mitigating, or eliminating the negative effects generally associated with load shedding for the horticultural producers, while allowing better energy management for the electrical utility.

In accordance with an aspect, there is provided a system for managing horticultural load shedding, the system including:

a plurality of horticultural light sources powered by an electrical utility, the plurality of horticultural light sources being disposed in a horticultural structure to irradiate at least one plant or crop;

a control module in data communication with the electrical utility, the control module being adapted to receive information associated with at least one load shedding event and, in response thereto, produce a control signal; and a rendering module adapted to:

receive and process the control signal; and send illumination instructions to the plurality of horticultural light sources to adjust an emission profile of the plurality of horticultural light sources, thereby mitigating potentially negative effects on said at least one plant or crop growth.

In some embodiments, the rendering module is further adapted to receive at least one lighting scenario.

In some embodiments, the rendering module is further adapted to receive a power consumption profile associated with each of the horticultural light sources.

In some embodiments, the emission profile includes spectral properties of each of the horticultural light sources.

In some embodiments, the emission profile includes intensity properties of each of the horticultural light sources.

In some embodiments, the emission profile includes an on/off status of each of the horticultural light sources.

In some embodiments, the information associated with said at least one load shedding event is representative of an expected load shedding event.

In some embodiments, the information associated with said at least one load shedding event is further representative of a timing and a duration of the expected load shedding event.

In some embodiments, the control module is configured to produce a notification upon reception of the information associated with said at least one shedding event.

In some embodiments, the control module is configured to determine a probability of the expected load shedding event.

In some embodiments, the illumination instructions are based on at least one integral indicator.

In some embodiments, the illumination instructions cause a gradual load flattening.

In some embodiments, the illumination instructions cause an instantaneous or an almost-instantaneous load flattening.

In accordance with an aspect, there is provided a method for managing horticultural load shedding, the method including:

receiving information associated with at least one load shedding event from an electrical utility, the electrical utility being configured to power a plurality of horticultural light sources and, in response thereto, produce a control signal; and receiving and processing the control signal; and sending illumination instructions to the plurality of horticultural light sources to adjust an emission profile of the plurality of horticultural light sources, thereby mitigating potentially negative effects on said at least one plant or crop growth.

In some embodiments, the emission profile includes spectral properties of each of the horticultural light sources.

In some embodiments, the emission profile includes intensity properties of each of the horticultural light sources.

In some embodiments, the emission profile includes an on/off status of each of the horticultural light sources.

In some embodiments, the information associated with said at least one load shedding event is representative of an expected load shedding event.

In some embodiments, the information associated with said at least one load shedding event is further representative of a timing and a duration of the expected load shedding event.

In some embodiments, the method further includes determining a probability of the expected load shedding event.

In some embodiments, the illumination instructions are based on at least one integral indicator.

In some embodiments, the illumination instructions cause a gradual load flattening.

In some embodiments, the illumination instructions cause an instantaneous or an almost-instantaneous load flattening.

Other features and advantages of the method and system described herein will be better understood upon a reading of preferred embodiments thereof with reference to the appended drawings. Although specific features described in the above summary and in the detailed description below may be described with respect to specific embodiments or aspects, it should be noted that these specific features can be combined with one another unless stated otherwise.

DETAILED DESCRIPTION

Figure 1:
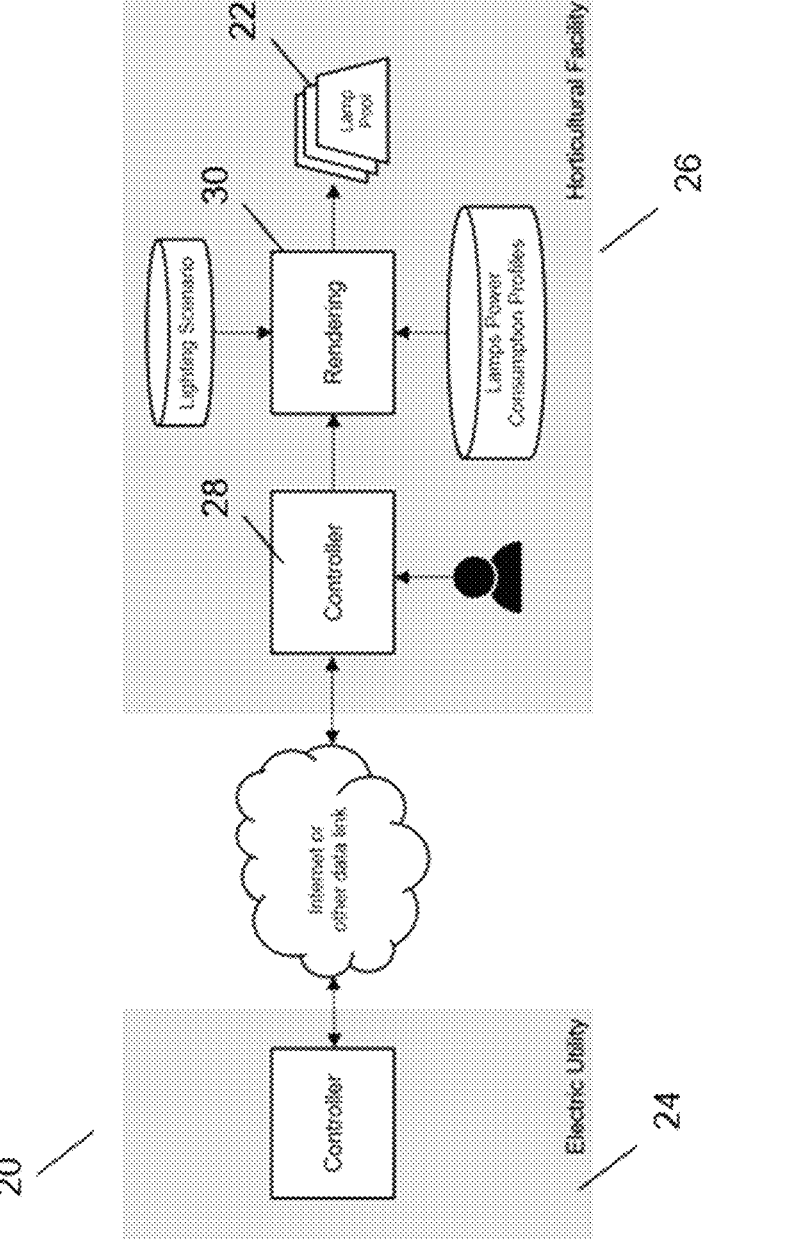
FIG. 1 illustrates an embodiment of a system for managing horticultural load shedding.

In the present description, similar features in the drawings have been given similar reference numerals. To avoid cluttering certain figures, some elements may not have been indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. More particularly, it will be understood that such spatially relative terms are intended to encompass different orientations in the use or operation of the present embodiments, in addition to the orientations exemplified in the figures.

The terms "a", "an" and "one" are defined herein to mean "at least one", that is, these terms do not exclude a plural number of items, unless stated otherwise.

Terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application.

Unless stated otherwise, the terms "connected" and "coupled", and derivatives and variants thereof, refer herein to any structural or functional connection or coupling, either direct or indirect, between two or more elements. For example, the connection or coupling between the elements may be acoustical, mechanical, optical, electrical, thermal, logical, or any combinations thereof.

The terms "match", "matching" and "matched" are intended to refer herein to a condition in which two elements are either the same or within some predetermined tolerance of each other. That is, these terms are meant to encompass not only "exactly" or "identically" matching the two elements but also "substantially", "approximately" or "subjectively" matching the two elements, as well as providing a higher or best match among a plurality of matching possibilities.

In the present description, the expression "based on" is intended to mean "based at least partly on", that is, this expression can mean "based solely on" or "based partially on", and so should not be interpreted in a limited manner. More particularly, the expression "based on" could also be understood as meaning "depending on", "representative of", "indicative of", "associated with" or similar expressions.

The term "computer" (or "computing device") is used to encompass computers, servers and/or specialized electronic devices which receive, process and/or transmit data. Computers are generally part of "systems" and include processing means, such as microcontrollers and/or microprocessors, CPUs or are implemented on FPGAs, as examples only. The processing means are used in combination with storage medium, also referred to as "memory" or "storage means". Storage medium can store instructions, algorithms, rules and/or data to be processed. Storage medium encompasses volatile or non-volatile/persistent memory, such as registers, cache, RAM, flash memory, ROM, as examples only. The type of memory is, of course, chosen according to the desired use, whether it should retain instructions, or temporarily store, retain or update data.

One skilled in the art will therefore understand that each such computer typically includes a processor (or multiple processors) that executes program instructions stored in the memory or other non-transitory computer-readable storage medium or device (e.g., solid state storage devices, disk drives, etc.). The various functions, modules, services, units or the like disclosed hereinbelow can be embodied in such program instructions, and/or can be implemented in application-specific circuitry (e.g., ASICs or FPGAs) of the computers. Where a computer system includes multiple computers these devices can, but need not, be co-located. In some embodiments, a computer system can be a cloud-based computing system whose processing resources are shared by multiple distinct business entities or other users.

It should be noted that, in the context of the current disclosure, the expression "plants or crops" may encompass a broad variety of multicellular organisms, including photosynthetic eukaryotes. Non limitative examples of plants or crops are seedlings, ornamental crops, ornamental plants, plugs, liners, fruits, small fruits, vegetables, leafy greens, herbs, young plants, high-value crops, and many others. The plants or crops may be produced for human food, non-human food or non-food applications. The growing process of the plants or crops generally includes a plurality of subsequent plant growth stages, such as, for example, seed germination (or "sprout"), seedling, vegetative, bud stage (or "budding"), flowering and ripening. It should be understood that, in the present description, the plants or crops can be at any one of the plant growth stages or at a transition between any two subsequent growth stages.

The expression "horticultural light", synonyms and derivatives thereof will be used throughout the present disclosure, and refers to the use of optical techniques, systems, and methods for assisting, maintaining, stimulating and/or optimizing plants or crops growth. The horticultural light may irradiate or illuminate the plants or crops during any one of the plant growth stages. The horticultural light, which is the light generated by the horticultural lighting apparatus, may be produced or generated using an artificial light source or similar devices, apparatuses, and systems. Non-limiting examples of artificial light sources include incandescent light sources, fluorescent light sources, high-intensity discharge (HID) light sources such as mercury vapor, metal halide (MH), high-pressure sodium (HPS) and low-pressure sodium (LPS) light sources, solid-state light sources including LED light sources, and laser sources. The horticultural light is associated with an illumination spectrum or profile. In some implementations, the horticultural light produced by the horticultural lighting apparatus have a profile substantially similar to light reaching the crop or plant. The expression "illumination spectrum" is used to broadly refer to the spectral power distribution of an illumination. The illumination spectrum can represent the distribution of power radiated per unit area and per unit wavelength or frequency over a spectral region of the electromagnetic spectrum. It should be noted that using horticultural light may be used to irradiate or illuminate plants or crops growing in a horticultural structure providing regulated climatic conditions to the plants or crops. Non-limitative examples of horticultural structures include greenhouse, glasshouse and hothouse.

In the present description, the terms "light" and "optical", and variants and derivatives thereof, are used to refer to radiation in any appropriate region of the electromagnetic spectrum. The terms "light" and "optical" are therefore not limited to visible light, but can also include, without being limited to, the infrared and ultraviolet regions. For example, in some implementations, the present techniques can be used with electromagnetic signals having wavelengths ranging from about 250 nm to about 2500 nm. However, this range is provided for illustrative purposes only and some implementations of the present techniques may operate outside this range. Also, the skilled person will appreciate that the definition of the ultraviolet, visible and infrared ranges in terms of spectral ranges, as well as the dividing lines between them, can vary depending on the technical field or the definitions under consideration, and are not meant to limit the scope of applications of the present techniques.

The expressions "natural light" or "natural light conditions" generally refer to light having spectral characteristics corresponding or similar to those of sunlight, moonlight or starlight. The spectral profile of natural light, particularly sunlight, varies as a function of geographic location, time of day, time of year, weather, cloud coverage, and several other factors. Several standards are known in the art to provide a spectral reference for natural light. For example, the Commission internationale de l'éclairage (CIE) has established the D series of well-defined daylight standard illuminants representing natural light under different conditions. One well-known standard is CIE Standard Illuminant D65, which is a daylight illuminant that intends to represent the average midday light in Western or Northern Europe. Other examples of CIE Standard Illuminants for daylight include the D50, D55, and D75 standard illuminants. Sunlight, which refers to the total spectrum of electromagnetic radiation emitted by the Sun and reaching the Earth, has a broad spectral range including ultraviolet radiation, visible light, and infrared radiation. Accordingly, standard illuminants extend within the solar radiation spectrum. For example, Standard Illuminant D65 extends from 300 nm to 830 nm. Non-limiting examples of natural light sources include sunlight, moonlight, starlight, twilight, lightning, and firelight.

In the present description, the term "solid-state light emitter" refers to any light-emitting device that converts electrical energy into electromagnetic radiation through the recombination of electronic carriers (i.e., electrons and holes) in a light emitting layer or region. The emitting layer or region can include, but is not limited to, silicon, silicon carbide, gallium nitride and/or other semiconductor materials, and may or may not include a substrate such as sapphire, silicon, silicon carbide and/or other microelectronic substrates. The solid-state light emitters can include both inorganic and organic light emitters, many of which are known to the skilled person and need not be described in detail herein. Non-limiting examples of types of solid-state light emitters include semiconductor light-emitting diodes (LEDs), semiconductor laser diodes, vertical cavity surface emitting lasers (VCSELs), other semiconductor light emitting devices or lamps, organic light-emitting diodes (OLEDs), and polymer light-emitting diode (PLEDs).

The expression "lighting scenario" is understood to refer to the generation of light, such as for illuminating purposes, according to predetermined optical characteristics (e.g., spectral content, intensity, polarization) that vary or evolve over time during a given time period. The optical characteristics of the generated light may correspond to or emulate those of natural lighting conditions. The natural light may emulate or be inspired from the actual light conditions experienced at a specific geographical location, date and time. It is appreciated that devising lighting scenarios that combine natural light conditions corresponding to different geographical locations is possible in some applications (e.g., a scenario could be build using sunrise, midday and sunset conditions corresponding to three distinct locations on Earth, at the same or different dates). In other embodiments, however, the natural light conditions may be different from real life conditions on Earth. By way of example, the spectrum of natural light generated according to the method described herein may differ from an actual spectral content of sunlight due to the absence of spectral components which are undesired or unnecessary in a given application context, or conversely by the enhancement or addition of wavelengths then are considered advantageous or required. The present techniques may rely on the use of solid-state light emitters. The solid-state light emitters can be driven to produce the lighting scenario using sets of control parameters. It should be noted that a plurality of lighting scenarios may be combined to collectively determine a "recipe" or a "recipe bundle". The recipe or the recipe bundle refers to a sequence of lighting scenarios.

In some embodiments, the lighting scenario may emulate lighting conditions over the course of a day, from dawn to dusk, or over a portion of a day. Indeed, the spectral contents of light reaching a particular location on earth from the Sun is not constant as the day progress. In some instances, it can be customary to characterize natural light according to its Correlated Color Temperature (CCT) value, expressed in Kelvin (K). By convention, the CCT is defined by the CIE as "the temperature of the Planckian radiator whose perceived color most closely resembles that of a given stimulus at the same brightness and under specified viewing conditions" (CIE/IEC 17.4:1987, International Lighting Vocabulary). Lower CCT values correspond to "warmer" light. Hence, a day with a clear blue sky can begin at dawn with light in a warm CCT spectrum range, such as between 1500 K and 3000 K, then progress to about 5000 K to 7500 K at mid-day and return to the 1500 K to 3000 K range towards dusk. In horticultural or agricultural applications, the light conditions in a region of the world from which a cultivated produce originates or where this produce is known to thrive can be emulated (e.g., growing tomatoes using light conditions from a sunny day in June in Tuscany). In other examples, the lighting conditions may be adapted in view of observations or discoveries regarding optimal or enhanced lighting conditions for growing a given agricultural output, such as for example to follow the McCree Curve, which represents the average photosynthetic response of plants to light energy.

Most controlled environment horticultural production facilities, such as vertical farming and greenhouses, consume significant amount of electricity from the grid to which they are connected. This consumption of electricity is typically largely directed toward artificial lighting and/or electrical heating purposes.

Much like other industrial clients, horticultural production facilities are subjected to constraints related to the management of the electrical grid by their utility company (e.g., electricity or power providers).

For instance, certain electrical utility companies may have industrial programs, with different incentives, such as special electricity tariffs, aimed at encouraging lower energy use at certain time or period of the day and/or night, during specific seasons, or at least portions thereof. For instance, in northern colder countries, the electrical utility typically wants to encourage its industrial users to lower their power consumption during late afternoon and early evening, a period during which people returning home can create an increased solicitation of the electrical grid.

In other situations, the electrical utility may temporarily interrupt the delivery of electricity to its industrial consumers to maintain the integrity of the electric grid and to prevent catastrophic grid failures and extended outages. This technique is commonly referred to as "load shedding".

Load shedding may occur if there is a shortage of electricity supply, or to help prevent power lines from becoming overloaded. Several factors can lead to load shedding, including extreme weather, sharply increased electric demand, unplanned generation plant outages, transmission constraints, unexpected damage to equipment, unavailability of purchased power or any combinations of these situations.

Load shedding may become necessary when the demand for electricity approaches available supply, creating potentially dangerous imbalance. Load shedding is one strategy for reducing power demand by turning off power supply to some customers to help prevent longer, larger outages. The immediate reduction of power demand is critical to prevent a catastrophic, extended failure of the larger electrical grid (or portion(s) or component(s) thereof).

In some situations, consumers may be notified in advance of such events. In other situations, there is simply no advanced notifications of the load shedding events.

Whether partial or complete, with or without advanced notification(s), the temporary lowering or shutdown of power consumption may have adverse impact(s) in the context of horticultural production.

Crops and plants depend on light for their development or growth. Plants have photoreceptors that can trigger different metabolic pathways when activated by photons of specific wavelengths and intensity. These different metabolic pathways influence plant anatomy, chemical composition, physiology, growth, and reproduction.

For optimal development, plants may need target amounts of daily light exposition at the right mix of wavelength. For instance, Daily Light Integral (DLI) describes the number of photosynthetically active photons (individual particles of light in the 400 to 700 nm range) that are delivered to a specific area over a 24-hour period.

Growers typically have a lighting strategy specific to crop type, variety, seasons, and many other factors. Some lighting strategies may be implemented using single or mix of fixed spectrum, fixed intensity, fixed spectrum, varying intensity, and varying spectrum lighting.

The lighting technologies used are typically HPS and LED-based. In some cases, HPS lighting intensity can be adjusted through dimming. In some case the light spectrum distribution of LED-based technologies may be modulated within various levels of range of possibilities.

Achieving certain total daily light and daily colors objectives is important to ensure crop success or viability. The reduction or powering-off of grow lighting due to electrical load shedding create situations where the crop may end-up have a deficit of daily light and colors. There is a need to assist the grower in dealing with these situations.

From an electrical utility perspective, abruptly shedding the consumer electrical load may not be the most desirable option. Also, it is an option that may need to be managed in the context of how critical a customer's operations are with regards to each other's, especially when considering food security imperatives.

The combined total electrical power consumed for lighting multiple horticultural facilities within an electrical utility network can amount to significant numbers: having the ability to manage it more proactively and intelligently can lead to improved load balancing on the network.

With regards to horticultural lighting, there is an opportunity to perform load shedding of the electrical network in a manner recognizing of the customers operations specificities, resulting in potential for more harmonious outcome for both the utility and its customers.

The present description relates to techniques for managing load shedding, for both the electrical utility company and the horticultural producers. The techniques that will be herein described may include the mitigation of the consequences of complete or partial losses of artificial lighting, which may be useful to mitigate or minimize the potentially negative impact(s) of load shedding(s) on the crops or plants growth.

The techniques provided herein include determining occurrence or probability of occurrence of a load shedding event or an expected load shedding event. Such a load shedding event may affect electricity or power availability in an electrical grid or network, and therefore has an impact of the illumination conditions of plants or crops being irradiated by horticultural light sources. Based on a temporal evolution of the energy consumption within the electrical grid or network, the present techniques may send illumination instructions to the horticultural light sources to adjust the emission of the horticultural light sources to mitigate potentially negative effects on the plants or crops growth.

Now turning to FIGS. 1 to 12, different embodiments of the technology will be presented.

There is provided a system 20 for managing horticultural light shedding. Broadly described, the system 20 includes a plurality of horticultural light sources 22 powered by an electrical utility 24. The horticultural light sources 22 are generally disposed in a horticultural structure 26 and are configured to irradiate at least one plant or crop. The system 20 also includes a control module 28 (sometimes referred to as a "controller") in data communication with the electrical utility 24. The control module 28 is adapted to receive information associated with at least one load shedding event and, in response thereto, produce a control signal. The system 20 also includes a rendering module 30, adapted to receive and process the control signal, and send illumination instructions to the plurality of horticultural light sources 22 to adjust an emission profile of the plurality of horticultural light sources 22, thereby mitigating potentially negative effects on said at least one plant or crop growth.

The horticultural light sources 22 are powered by the electrical utility 24, and so may be connected to an electrical grid. The expression "electrical grid" will be used throughout the description to refer to an interconnected network configured to deliver electricity from the electrical utility 24 (i.e., an electricity-generating facility) towards a consumption point. The electrical utility 24 may be referred to as a power station, a power plant, a generating station, or a generating plant. The consumption point may be of various types and configurations and may for example be embodied by a horticultural structure or a plurality of interconnected horticultural structures. In some embodiments, the horticultural light sources 22 may be embodied by a lamp similar to the lighting system described in WO 2016119063, the content of which is incorporated herein by reference.

The control module 28 is in data communication with the electrical utility 24, and so may be operatively connected to the same. The control module 28 may be connected to the electrical utility 24, or a component thereof, such as a controller, using a communication link. For example, and without being limitative, the communication link may rely on the internet or any data link. Of note, the electrical utility 24 may include or may be operatively connected to one or more electrical utility controllers. The control module 28 may then be operatively connected to the electrical utility controllers.

Of note, the control module 28 may include or may be operatively connected to one or more controller(s), processor(s), and/computer(s) and is configured to perform a series of steps that will be described in greater detail later.

The control module 28 is configured to obtain or receive data, signal(s) and/or information from the electrical utility 24. The data, signal(s) and/or information are associated with at least one load shedding event. In the context of the current disclosure, a load shedding event is an indication that the electricity or power availability may change, and more specifically be reduced, at a certain time and for a certain duration. In some embodiments, the information associated with the shedding event(s) is representative of an expected or future load shedding event. In some embodiments, the information associated with the load shedding event(s) is further representative of a timing and a duration of the expected load shedding event. In some embodiments, the control module 28 is configured to produce a notification upon reception of the information associated with the load shedding event(s). In some embodiments, the control module 28 is configured to determine a probability of the expected load shedding event.

In response to obtaining or receiving information associated with a load shedding event, the control module 28 is adapted to produce a control signal. The control signal is received and processed by the rendering module 30. The rendering module 30 is operatively connected to the control module 28 and the horticultural light sources 22. In some embodiments, the rendering module 30 is further adapted to receive at least one lighting scenario. In some embodiments, the rendering module 30 is further adapted to receive a power consumption profile associated with each of the horticultural light sources 22. The power consumption profile is representative of a power usage of the horticultural light sources 22. The expression "power usage" herein refers to the power consumption, i.e., the electricity or energy being used by the horticultural light sources 22 to maintain their operation. In some embodiments, the power usage may be determined, measured, detected, reported, and/or estimated. In some embodiments, the evaluation of the power usage may be performed in real time, near real time or at predetermined intervals. In some embodiments, the predetermined intervals may be synchronized or at least partially timed with a photoperiod or a portion thereof.

The rendering module 30 is adapted to send illumination instructions to horticultural light sources 22 to adjust an emission profile of the plurality of horticultural light sources 22, in order to mitigate potentially negative effects on the plant(s) or crop(s) growth. In some embodiments, the emission profile includes spectral properties of each of the horticultural light sources 22. In some embodiments, the emission profile includes intensity properties of each of the horticultural light sources 22. In some embodiments, the emission profile includes an on/off status of each of the horticultural light sources 22.

In some embodiments, the illumination instructions are based on at least one integral indicator. In some embodiments, the illumination instructions cause a gradual load flattening. In some embodiments, the illumination instructions cause an instantaneous or an almost-instantaneous load flattening.

In the case of horticultural light sources 22 including LEDs or similar technologies, it should be noted that the LEDs generally represent a significant portion of the power usage of the horticultural light sources 22. If the horticultural light sources 22 have an adjustable spectral power distribution (SPD), the power consumed by the LEDs may change according to the spectral profile required to obtain a predetermined SPD, i.e., the power usage of a horticultural light source 22 can change over time. The power used by each LED affects the collective power usage of the horticultural light sources 22. The illumination instructions may allow controlling one or more LEDs of the horticultural light sources 22.

The rendering module 30 may be configured to track a power usage of the horticultural light sources 22 and provide a temporal profile of the power usage of the horticultural light sources 22, or any other representation(s) of the evolution of the power usage of the horticultural light sources 22 over time. The rendering module 30 may be configured to continuously or semi-continuously track the power usage of the horticultural light sources 22 and identify properties of the temporal profile of the power usage that can be related to potential or expected load shedding events. Doing so, the rendering module 30 may be configured to predict future load shedding events affecting that would potentially affect the illumination conditions.

In some embodiments, the system 20 may be configured to detect of one or more signals representative of the horticultural environment. For example, the signals may be representative of changing climatic conditions in the horticultural environment, which may affect illuminations conditions of the plants or crops.

In some embodiments, each horticultural light source 22 is associated with at least one dedicated power supply. The dedicated power supply may have an "on" state and an "off" state. In some embodiments, the dedicated power supply may have a "stand-by" state (sometimes referred to a "stand-by" mode). In some embodiments, each horticultural light source 22 may include one dedicated power supply. In other embodiments, each horticultural light source 22 may include a plurality of dedicated power supplies. In some embodiments, the illumination instructions may cause a load flattening through the power supplies of the horticultural light sources 22.

In some embodiments, the system 20 may include a visualization module or a display in data communication with the control module 28 and/or the rendering module 30.

In some embodiments, horticultural zone(s) may be defined within the horticultural structure 26, and the illumination instructions may be sent to only some zones of the horticultural structure 26, for example to zone(s) including plants or crops having already received their daily targets in terms of illumination conditions, or to zone(s) including plants or crops that are less sensitive to their illumination conditions, in comparison with other plants or crops.

Figure 2:
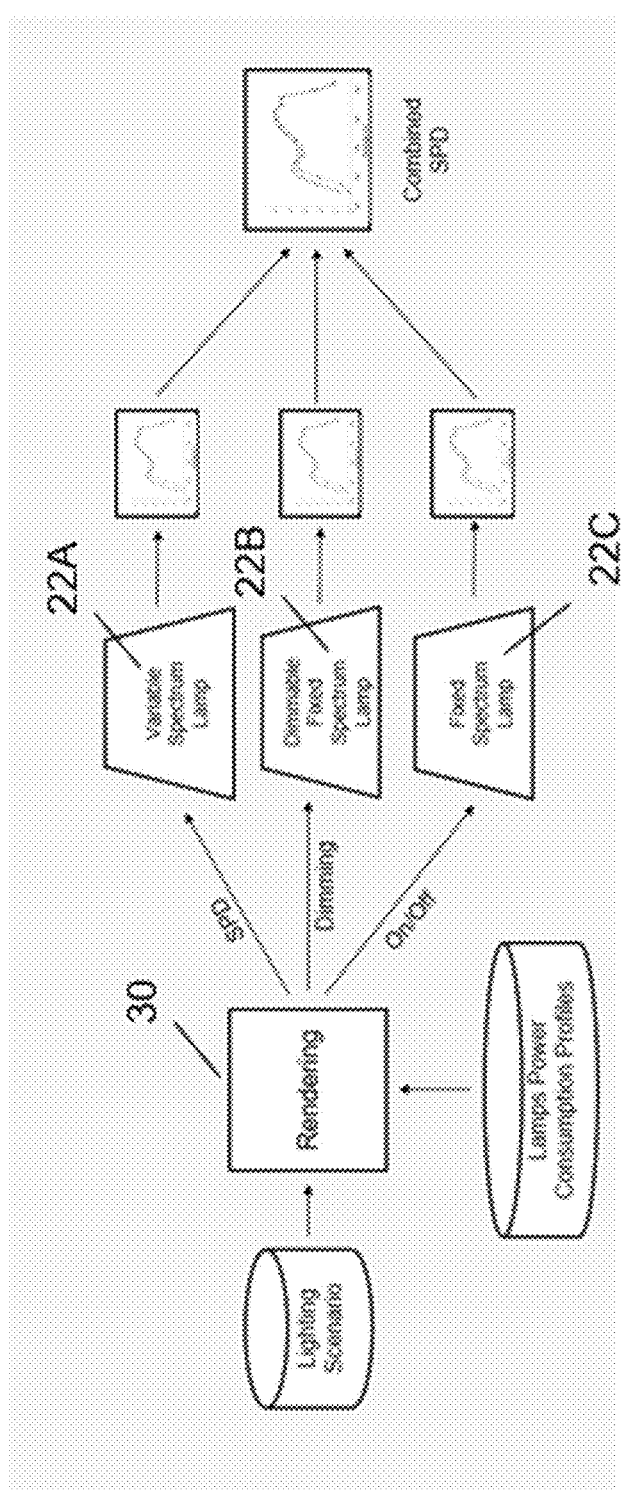
FIG. 2 illustrates another embodiment of a system for managing horticultural load shedding.

With reference to FIG. 2, there is illustrated an embodiment of a system 20 for managing horticultural load shedding. As illustrated, the horticultural light sources 22 are different "types" of horticultural lamps. For example, the horticultural light sources may include one or more variable spectrum lamps 22A, one or more dimmable fixed spectrum lamps 22B and/or one or more fixed spectrum lamps 22C. In this embodiment, which may be referred to as "rendering of light scenario using multiple lamp technologies", the rendering module 30 is configured to send illumination instructions to each of these lamps 22A,B,C. Of note, the illumination instructions may vary from one lamp to another. Indeed, the illumination instructions may alter or adjust an SPD, an intensity and/or an "on/off" status of the lamps.

Figure 3:
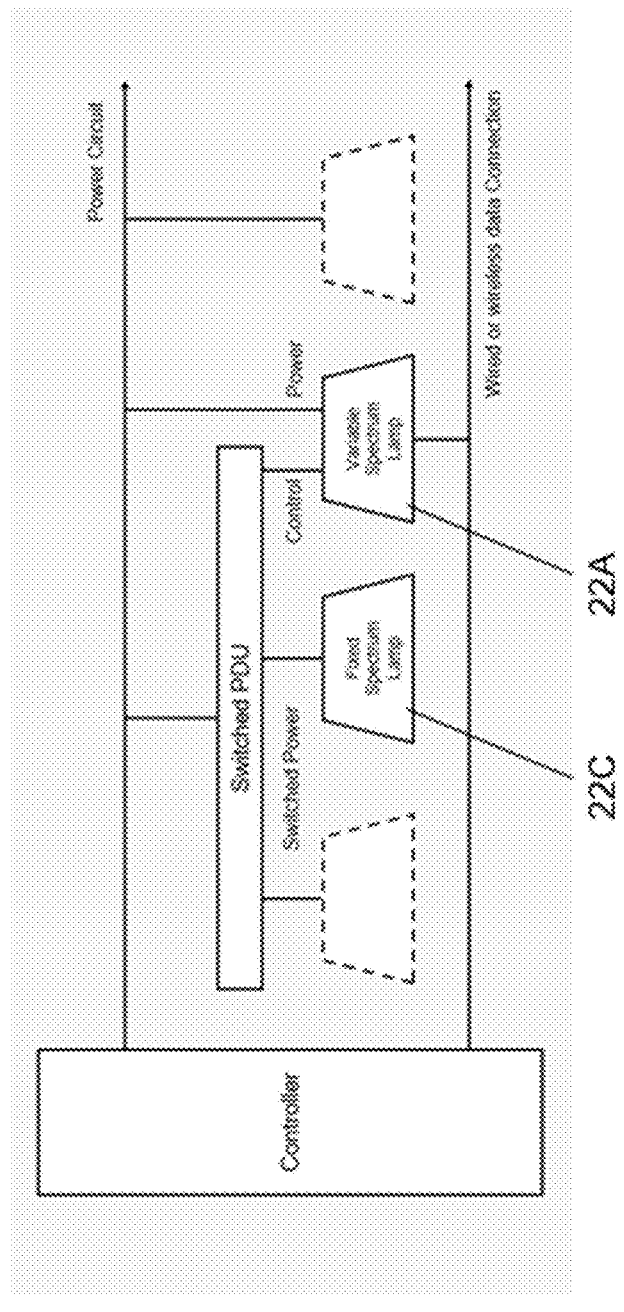
FIG. 3 shows an interaction between a fixed spectrum lamp and a variable spectrum lamp, in accordance with one embodiment.
Figure 4:
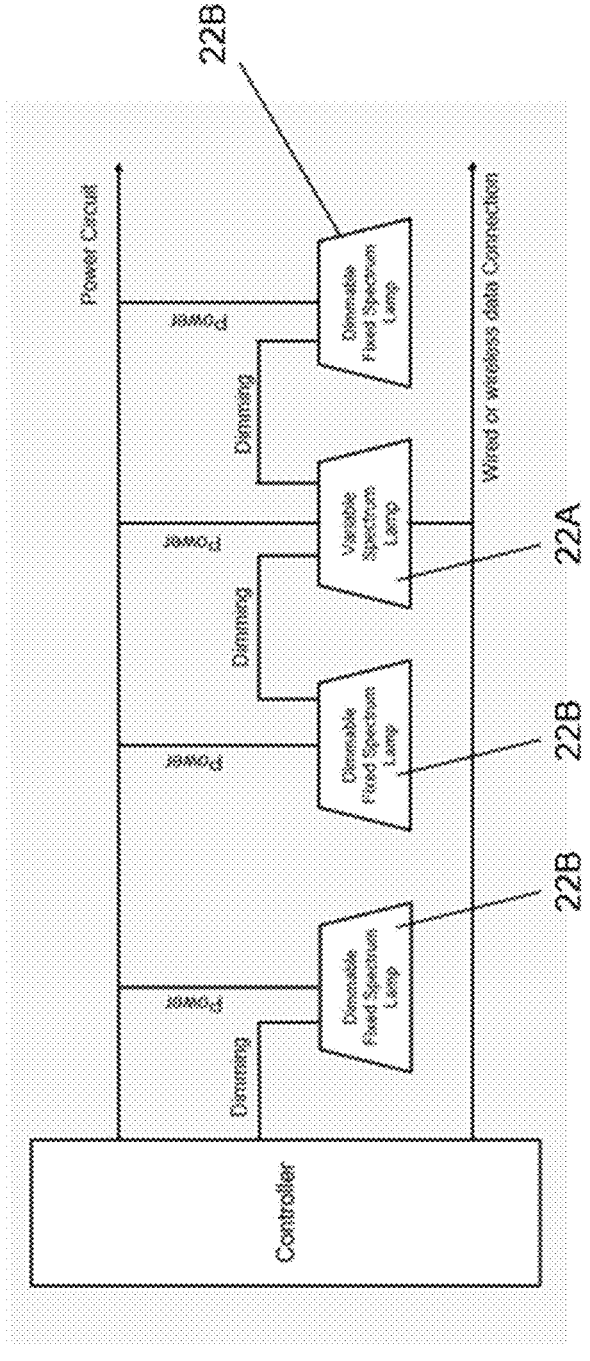
FIG. 4 shows an interaction between a variable spectrum lamp and three dimmable fixed spectrum lamps, in accordance with one embodiment.

Now turning to FIG. 3, there is illustrated how the elements or components of a fixed-spectrum lamp 22C may cooperate or interact one with another, or with other types of lamps, such as the lamps 22A,B,C described above. With reference to FIG. 4, there is illustrated how the elements or components of a dimmable fixed-spectrum lamp 22B may cooperate or interact one with another, or with other types of lamps, such as the lamps 22A,B,C.

Figure 5:
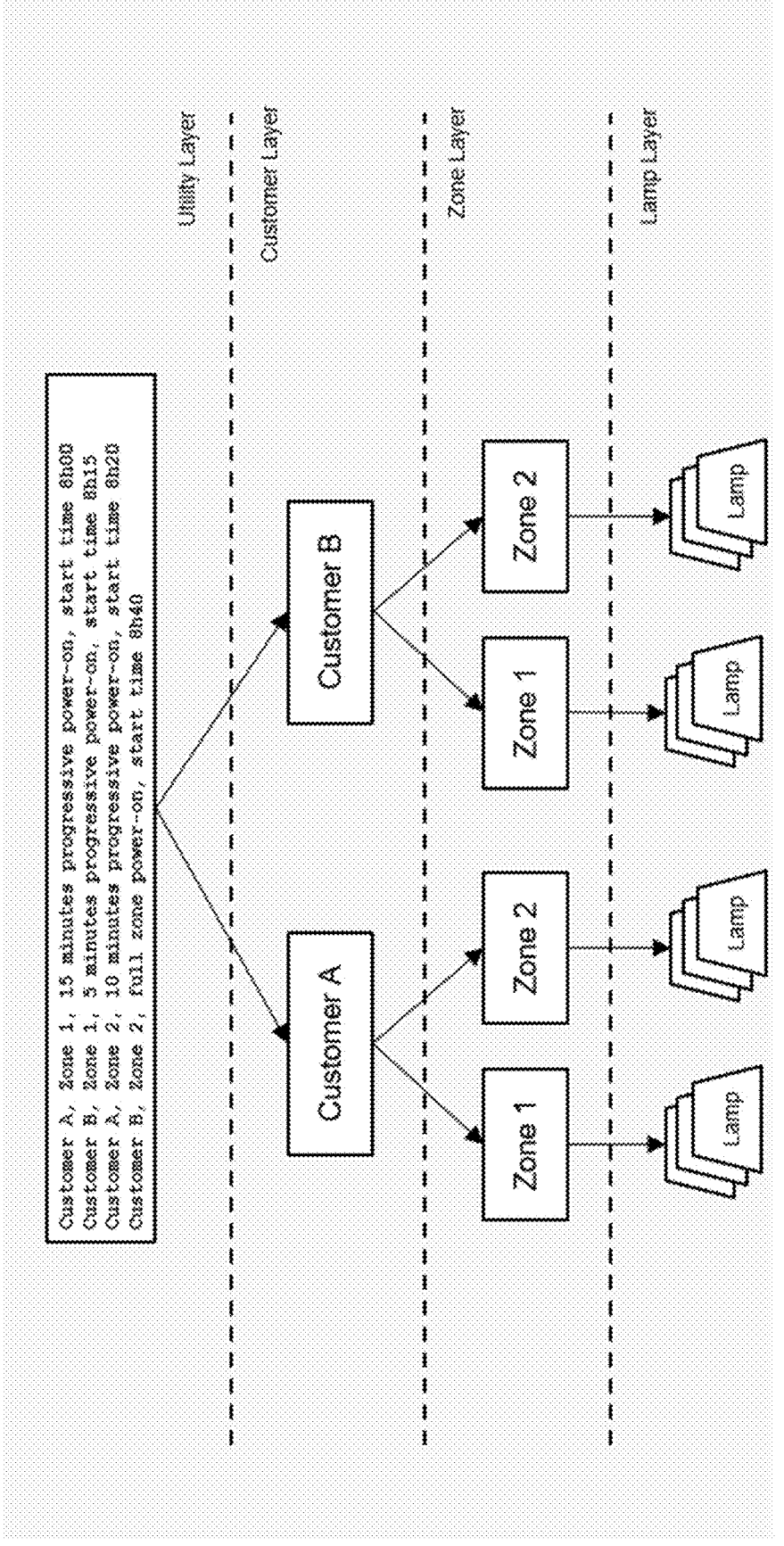
FIG. 5 is an illustration of an embodiment in which the load shedding events are scheduled or implemented according to a predetermined schedule.

Now turning to FIG. 5, there is illustrated an embodiment in which the load shedding events are scheduled or implemented according to a predetermined schedule. This approach may be referred to as "schedule-based load balancing". In this embodiment, each customer or grower connected to the electrical utility 24 is aware or periodically informed of upcoming load shedding events. All the customers may be similarly or, alternatively differently, affected by the load shedding events or schedule. In the illustrated example, Customer A operates two zones, each being submitted to different load shedding conditions or restrictions, and Customer B operates two zones, each being submitted to different load shedding conditions or restrictions.

Figure 6:
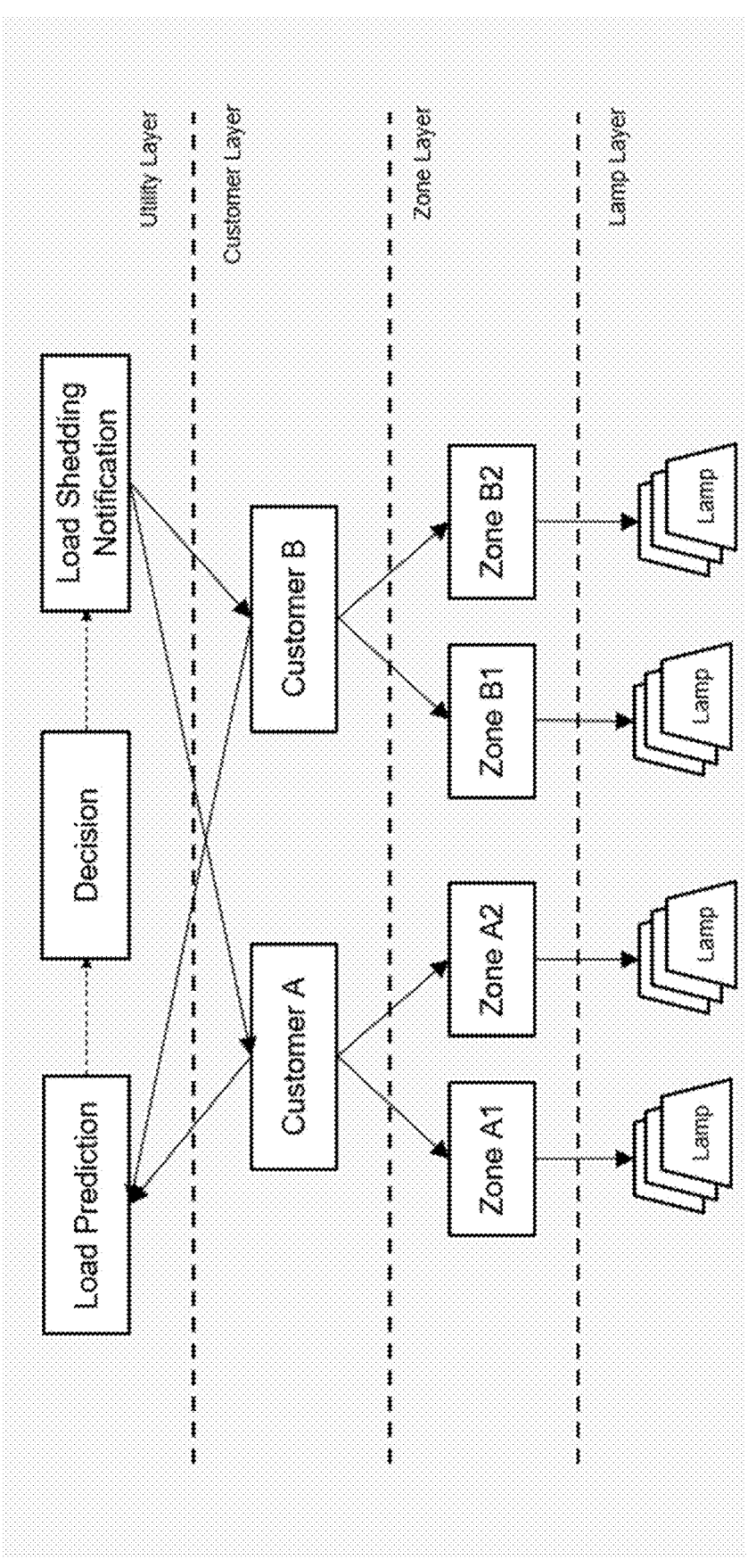
FIG. 6 shows preventive and palliative mitigation load shedding events, in accordance with one embodiment.

However, it sometimes remains impossible to predict or determine in advance the occurrence and/or the duration of a load shedding event. With reference to FIG. 6, the preventive and palliative mitigation load shedding events will be presented. In this embodiment, the electrical load may be predicted by the electrical utility 24. Based on their predictions, the electrical utility 24 produces a decision and then a notification for informing customers that will potentially be affected by load shedding event(s). The decision is subsequently used to alter the illumination conditions in appropriate horticultural zone(s), for each customer. Of note, the customers may directly, indirectly, continuously, or periodically inform the electrical utility 24 of their power consumption or any other data that may be used to predict future electrical load, and therefore future load shedding events. It should be noted that the customers may either cooperate in their load shedding planification, for instance by timing their power consumption, or be in competition. In the latter case, each customer may apply for preferred time slots and/or duration for future load shedding event, and priority may be given to a customer meeting predetermined criterion, for example past power consumption. In some embodiments, the electrical utility 24 may provide a shared platform, which may include a calendar, to schedule or book periods during which load shedding events are expected.

Figure 7:
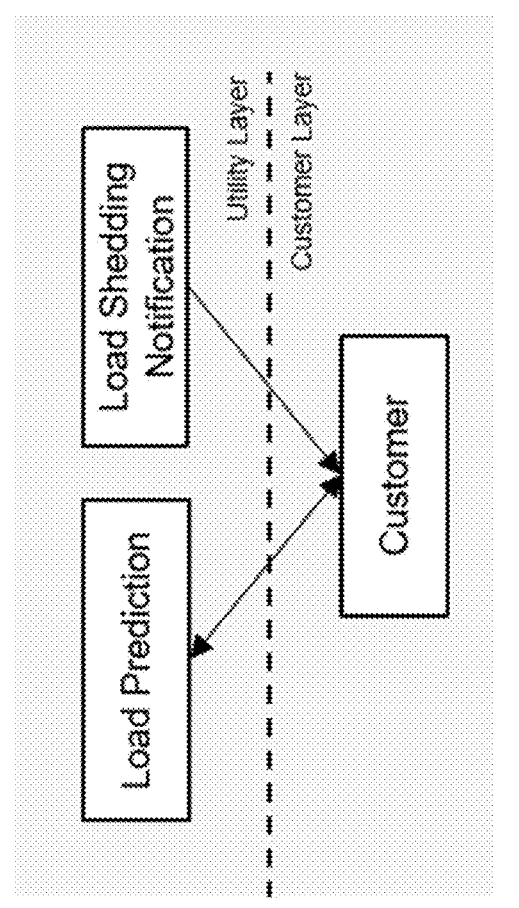
FIG. 7 illustrates an example of horticultural load shedding management.

Now turning to FIG. 7, an example will be described. The electrical utility 24 may send time and duration of load shedding event(s) to their customers. The customer may react by adjusting the lighting recipes, either manually or automatically. Of note, attaining predetermined targets may relief customers from load shedding events and/or financial impacts. In some embodiments, the electrical utility may share the probability of an upcoming load shedding event occurring with the customer to enable additional prevention flexibility.

Figure 8:
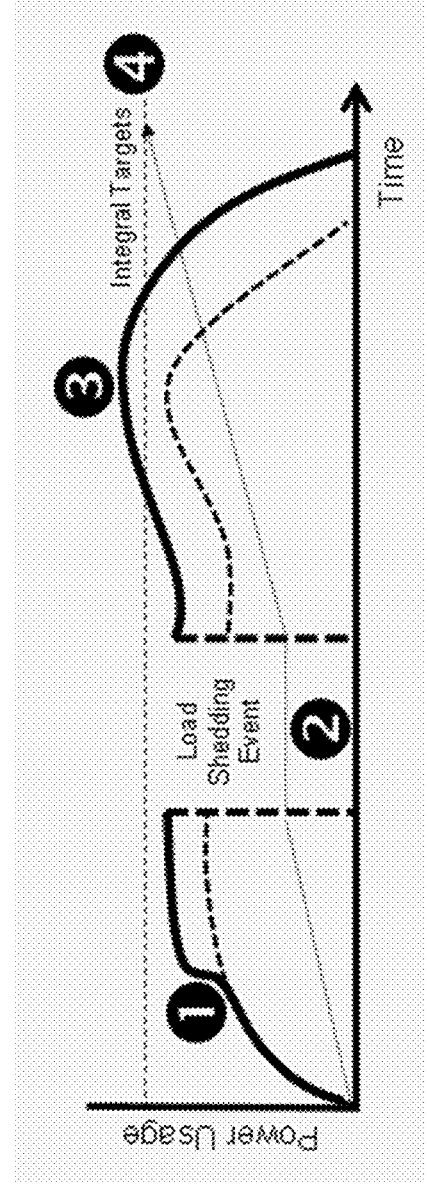
FIGS. 8 to 10 show examples of potential effects of a load shedding event.
Figure 9:
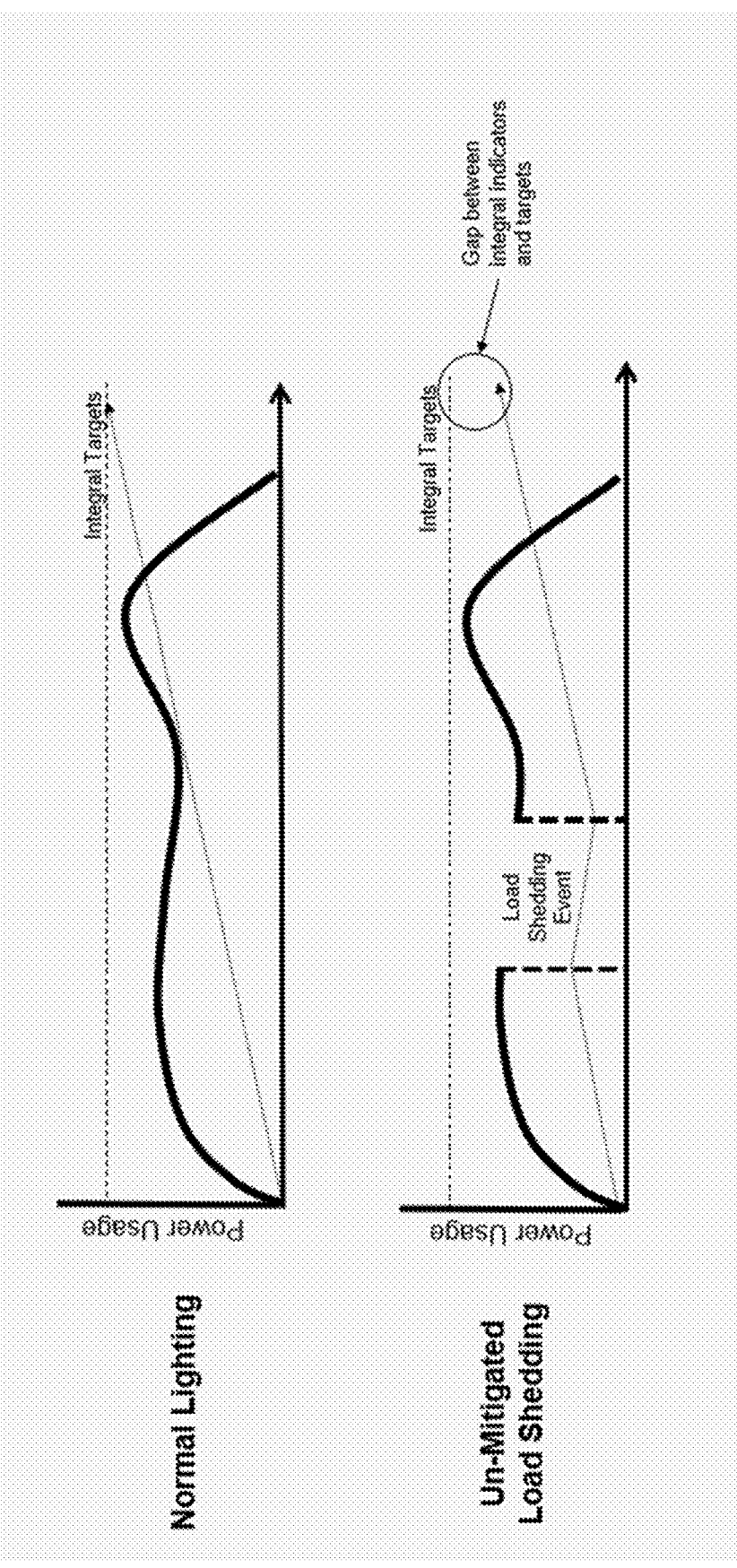
Figure 10:
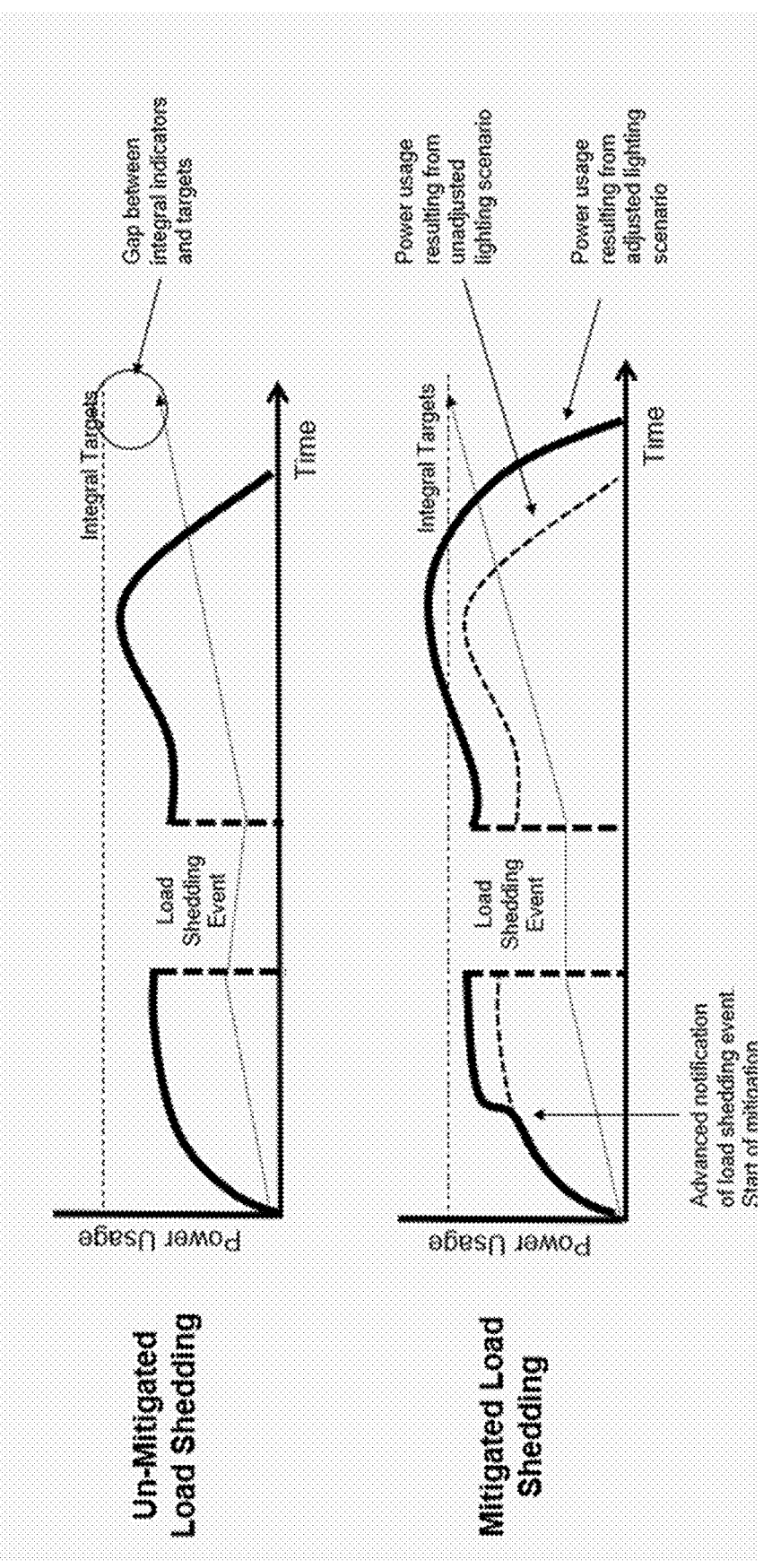

With reference to FIGS. 8 to 10, a nonlimitative example of the effects of a load shedding event will be described. At stage 1, SPD is altered in anticipation of a power shedding event, for instance by augmenting the certain colors intensity, resulting in higher total power consumption. At stage 2, SPD is altered during a power shedding event, for instance by turning off lighting, resulting in lower total power consumption. At stage 3, SPD is altered after a power shedding event, for instance by gradually incrementing the general light intensity, resulting in higher total power consumption. At stage 4, dynamic modulation is achieved with respect to integral indicator targets, such as DLI, and their respective priorities. FIG. 9 illustrates the potential negative impact of a load shedding event. As illustrated, there is a gap between the targeted integral indicators and the achieved integral indicators. FIG. 10 illustrates how the present techniques allow mitigating the load shedding event. As illustrated, adjusting the lighting scenario has an effect on the power consumption, and so may be useful to meet predetermined targets, notably in terms of targeted integral targets.

Figure 11:
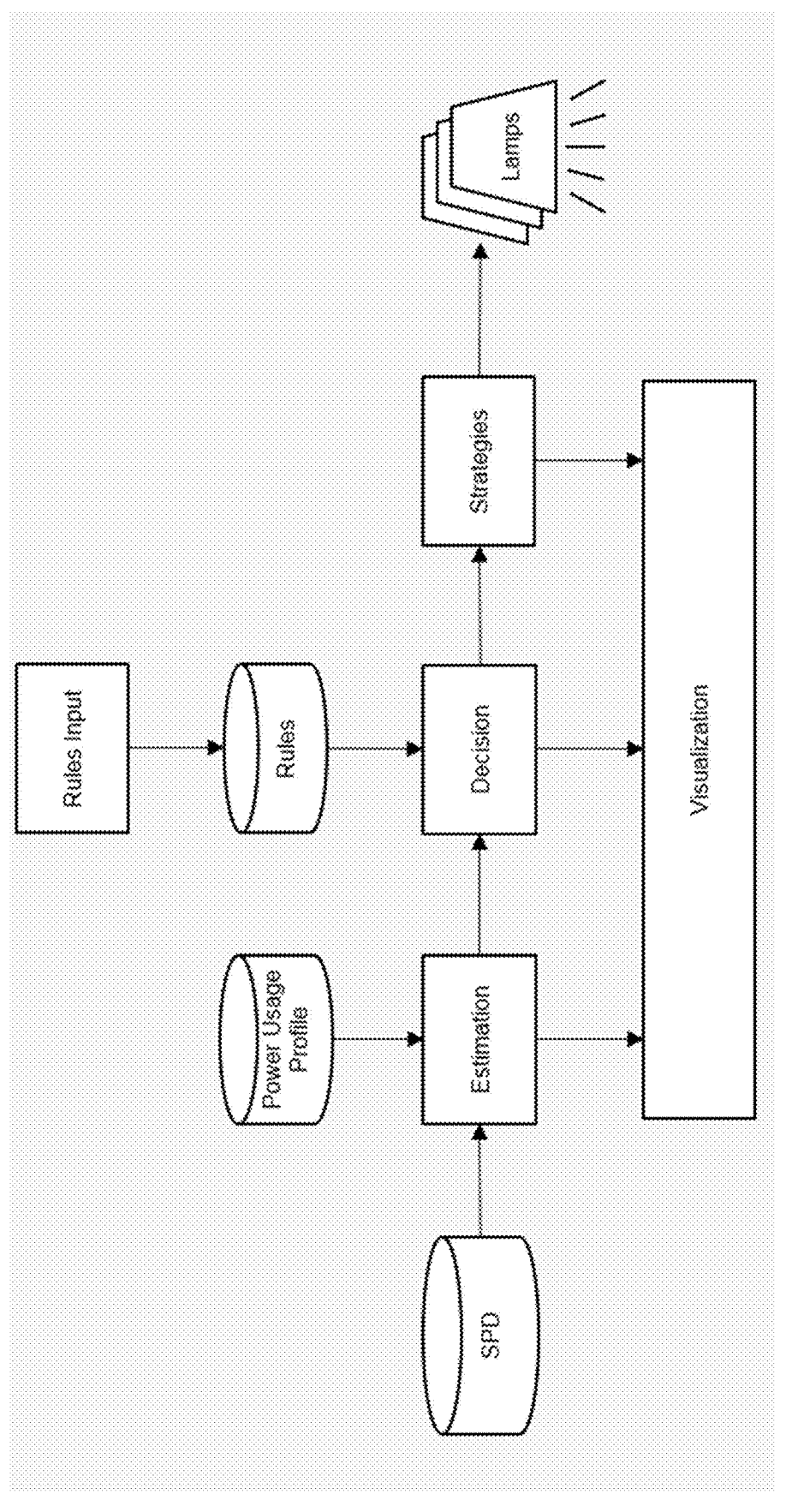
FIG. 11 illustrates another embodiment of a system for managing horticultural load shedding.

Now turning to FIG. 11, there is illustrated an embodiment of the system.

Figure 12:
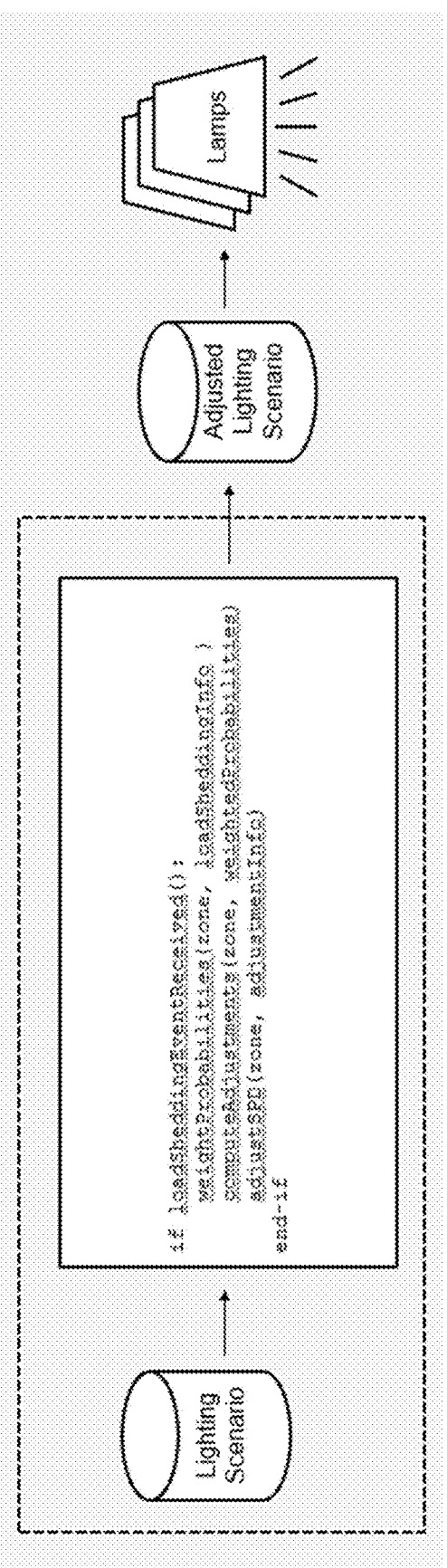
FIG. 12 shows an embodiment of a load-shedding smart lighting scenario.

With reference to FIG. 12, there is illustrated an embodiment of a load-shedding smart lighting scenario. The load-shedding smart lighting scenario combines one or more lighting scenarios files with computer readable instructions designed to handle load-shedding mitigation in the context of the specific lighting scenario and that final output an adjusted lighting scenario.

There is also provided a method for managing horticultural load shedding. The method includes receiving information associated with at least one load shedding event from an electrical utility 24, the electrical utility 24 being configured to power a plurality of horticultural light sources 22 and, in response thereto, produce a control signal. This step may be achieved with the control module herein described. The method also includes receiving and processing the control signal and sending illumination instructions to the plurality of horticultural light sources 22 to adjust an emission profile of the plurality of horticultural light 22, thereby mitigating potentially negative effects on said at least one plant or crop growth. These steps may be achieved with the rendering module 30 herein described.

In some embodiments, the emission profile includes spectral properties of each of the horticultural light sources. In some embodiments, the emission profile includes intensity properties of each of the horticultural light sources. In some embodiments, the emission profile includes an on/off status of each of the horticultural light sources. In some embodiments, the emission profile may include one or more of the abovementioned properties.

In some embodiments, the information associated with said at least one load shedding event is representative of an expected load shedding event. In some embodiments, the information associated with said at least one load shedding event is further representative of a timing and a duration of the expected load shedding event.

In some embodiments, the method further includes determining a probability of the expected load shedding event.

In some embodiments, the illumination instructions are based on at least one integral indicator. In some embodiments, the illumination instructions cause a gradual load flattening. In some embodiments, the illumination instructions cause an instantaneous or an almost-instantaneous load flattening.

In some embodiments, some steps of the proposed methods are implemented as software instructions and algorithms, stored in computer memory and executed by processors. It should be understood that computers are therefore required to implement to proposed system, and to execute the proposed method. In other words, the skilled reader will readily recognize that steps of various above-described methods can be performed by programmed computers. In view of the above, some embodiments are also intended to cover program storage devices, e.g., digital data storage media, which are machine or computer readable and encode machine-executable or computer-executable programs of instructions, wherein said instructions perform some or all of the steps of said above-described methods. The embodiments are also intended to cover computers programmed to perform said steps of the above-described methods.

In some embodiments, the transmission of the signals between the modules or components of the systems having been described may rely on different protocols and methods. For example, and without being limitative, the protocols and methods may involve internet communications, streaming, cloud storage, private network, server(s), and/or any combinations thereof. In some embodiments, the signals being sent and/or received by modules or components of the systems having been described may be standardized or meet the requirements of any relevant norms. It should be noted that the expression "signals" also encompass the illumination instructions and the control signals having been herein described.

In accordance with another aspect of the present description, there is provided a non-transitory computer readable storage medium having stored thereon computer executable instructions that, when executed by a processor, cause the processor to perform the methods that have been previously described. The non-transitory computer storage medium can be integrated to the systems or assemblies that have been described in the present description. The non-transitory computer storage medium could otherwise be operatively connected with the systems or assemblies. In the present description, the terms "computer readable storage medium" and "computer readable memory" are intended to refer to a non-transitory and tangible computer product that can store and communicate executable instructions for the implementation of various steps of the method disclosed herein. The computer readable memory can be any computer data storage device or assembly of such devices, including random-access memory (RAM), dynamic RAM, read-only memory (ROM), magnetic storage devices such as hard disk drives, solid state drives, floppy disks and magnetic tape, optical storage devices such as compact discs (CDs or CDROMs), digital video discs (DVD) and Blu-Ray™ discs; flash drive memory, and/or other non-transitory memory technologies. A plurality of such storage devices may be provided, as can be understood by those skilled in the art. The computer readable memory may be associated with, coupled to, or included in a computer or processor configured to execute instructions contained in a computer program stored in the computer readable memory and relating to various functions associated with the computer.

EXAMPLES

Now that different embodiments of the technology have been described, nonlimitative examples illustrating a potential implementation of the techniques will be presented. It should be noted that this example serves an illustrative purpose only and should therefore not be considered limitative.

According to a first example, there are provided techniques for scheduled-based load balancing or adjusting. The techniques according to the first example may include producing or generating predictive load-shedding notifications.

A specific or predetermined electricity tariff program (or a "fee schedule") may be made available for horticultural producers of one or more regions by the local electrical utility (i.e., the entity responsible of generating, transmitting and/or distributing electricity).

According to the tariff program, horticultural producers may have access to favorable electricity prices, fees, or tariffs during at least a portion of at least one season, or during a whole season. In exchange, horticultural producers adhering to the program may be submitted to at least one of the following requirements:

Producers are encouraged to have specific control equipment and software, as well as specific lighting fixtures installed within their facilities or horticultural structure;

The control equipment should be connected to the electrical utility over a public or private data network; and/or Under a defined protocol, the produces should agree to release a limited and agreed-on control of the lighting coverage, intensity and/or spectrum distribution, to the electrical utility during load shedding events, when the grid load is at its peak.

At certain time or period of the calendar year, growers may be invited to a participate or share a centralized schedule reservation process managed under the coordination of the electrical utility. During this process, growers may communicate the specificities of their lighting requirements for the upcoming months, in order to predict electrical or power consumption. Non limitative examples of lighting requirements may include lighting zones and facilities, lighting equipment configurations (types of lamps, associated power consumption patterns, etc.), lighting plan, lighting scenarios and/pr durations.

The electrical utility may then use this information to forecast the upcoming daily and nightly power consumption patterns of participating producers and forecast the related grid load. The producers forecasted electrical load may then be used to coordinate lighting schedules between producers, facilities, and zones.

The coordinated schedule aim at reducing power load overlaps between producers and facilities during lighting periods as well as lower or eliminate schedule overlaps between producers and facilities after load-shedding events, when its will be desirable to have a progressive recovery of the electrical demand on the network.

A mechanism is in place for participating producers to provide their input on the proposed schedule and request adjustments.

Once this process is completed, the finalized lighting schedule may then remotely be programmed into participating producers control systems to become effective at a specific predetermined date.

From this point on, growers' activities can proceed as usual under the governance of the coordinated lighting schedule, with the benefit of a special favorable horticultural electricity tariff provided.

During high electricity demand season, certain period of the day may be more problematic, as the grid load demand may increase to levels jeopardizing the integrity of the whole system.

The electric utility may then enter a load management operational mode where they try to anticipate short term upcoming gid load using various data points such as last year same period demand, forecasted weather and other factors. This process looking may predict for future 24 to 48 hour windows.

In that specific scenario, participating producers control systems benefits are configured to receive information related to the possibility of an upcoming load shedding event. This information enables predictive management of the upcoming load shedding events: where a non-participating producer would only receive a load shedding notice ahead of the actual event, participating producers receive a probability factor of having a specific load shedding event as well as the anticipated lead shedding period.

For instance, the producers may operate multiple facilities organized in multiples zones. Each zone may have its own crop and lighting need, and each zone may have its own specific DLI and color ratios target rules. For example, for a specific zone, the producer may have configured the regulation mechanism as follows:

DLI Target (mol m-2 d-1): 14, priority 1;
Red to Far Red ratio: 2.5, priority 2; and
Red to Blue ratio: 1.6, priority 3.

In the context of our participating producer, the probability information is automatically used by a mitigation algorithm to adjust the lighting scenario.

For instance, weighting all predictive data, the algorithm may calculate that, for the given zone, increasing the red intensity by 15% and lowering the Far Red by 5%, ahead of the forecasted load shedding event, will enable to achieving the target DLI and color ratios targets. Other zones may have different targets and rules but are mitigated in a similar manner.

The producer may operate multiple facility with one or more zones per facilities. Different lighting scenarios may be applied to these zones.

In some cases, the lighting scenario may be subjected to the algorithmic mitigation by mean of a generic mitigation algorithm.

In other cases, for certain other more advanced lighting scenarios, scenario-aware recipes are built-in the lighting scenario, effectively providing a mean of lighting scenarios with self-contained self-aware mitigation.

The mechanism described here allows the producer going through the high demand season and associated electrical load restrictions while both minimizing the negative impacts on the crop and the grid requirements.

Additionally, in that example, in exchange for adhering to the program, and contribution to the collaborative management of the grid load during the high-demand season, the producer also benefits from a favorable electricity tariff, yearlong.

According to a second example, there are provided techniques for preventive and/or palliative mitigation. The techniques according to the second example may be used by horticultural producers having operations in an area where the electrical grid is subject to frequent load shedding events during high-demand season.

Some producers may operate in multiple zones. Some zones may fully be equipped with variable spectrum lighting, other zones may be equipped with a mix of variable spectrum and dimmable fixed spectrum lighting. The producer may be equipped with the preventive (or "pre-emptive") and palliative mitigation control system.

The producer may be notified 18 h to 24 h before the actual need to lower its power consumption during the upcoming grid load peak time. The load shedding period may be fixed and may, for example occur between 17 h and 19 h.

During those periods, if the producer is unable to lower its power consumption under certain thresholds, a punitive tariff may be applied to its electrical bill at the end of the month.

Zones may all be connected and controlled by the preventive and palliative mitigation control system. From a control perspective, all lighting may be controlled or governed by lighting scenarios, independently of the lighting technologies mix deployed in specific zones.

The zone specific for this example may be equipped with a mix of fixed-spectrum dimmable HPS lighting and intelligent variable spectrum lamps.

Each intelligent variable spectrum lamp may be paired with and connected to two fixed-spectrum dimmable HPS lamps. The variable spectrum lamp may control the HPS lighting intensity via a variable 0 v-10 v connection.

The lamps groups may be physically deployed above the crop to achieve a uniform distribution of the blended spectrum across the entire zone surface.

The variable spectrum capabilities of the intelligent lamps combined with the ability to modulate the intensity of the fixed spectrum lamp results in an extended range of possible blended spectrum power distributions and associated power consumption.

The preventive and palliative mitigation control system may be configured with the zones specifications, lamps configurations, technologies, their respective spectral power distribution capabilities and power consumption profiles.

Each zone may have its own crop and lighting needs. Thus, each zone may have its own specific DLI and color ratios target rules.

As an example, for a specific zone, the producer may configure the regulation mechanism as follows:

DLI Target (mol m-2 d-1): 15, priority 1; and
Red to Blue ratio: 1.8, priority 2.

Upon receiving a load shedding notification, the date, time, and duration of the planned load shedding event may be inputted into the Mitigation system. The mitigation system may also be configured with the target power consumption reductions.

The mitigation system may then use that information to compute the optimal changes in spectral power distribution and/or intensity needed to achieve the power downsizing targets during the load shedding event and it may compute the optimal pre and post load shedding event spectral power distribution boost as needed to compensate for the downsizing of the electrical consumption during the load shedding event.

For instance, the system may calculate that, for the given zone, increasing the red intensity by 10% and ahead and after of the planned load shedding event, will enable DLI and daily color ratios that are as close to the targets as they can be. The grower may choose to perform manual adjustments to the strategy.

The mitigated lighting scenario may then be rendered by achieving a blending of lamp-specific spectral power distributions. In the configuration according to the second example, achieving targets and variability of the blended spectrum may involve dimming up or down the fixed spectrum variable lights, turning out lights and variating the colors and intensity of the variable spectrum lamps.

The growers do not control the fixed spectrum lamps dimming and on/off status directly, or the color mix and intensity of the variable spectrum lamps directly. These tunings are abstracted from the grower interventions by the mean of spectral power distribution and its associated states power requirements.

Other zones may have different targets and rules but may be mitigated in a similar manner.

The mechanism described here allows the producer going through the high demand season and associated electrical load restrictions while both minimizing the negative impacts on the crop and the grid requirements and financial consequences of not achieving those.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the present disclosure.

The invention claimed is:

1. A system for managing horticultural load shedding, the system comprising:
   a plurality of horticultural light sources powered by an electrical utility, the plurality of horticultural light sources being disposed in a horticultural structure to irradiate at least one plant or crop;
   a control module in data communication with the electrical utility, the control module being adapted to receive information associated with at least one load shedding event and, in response thereto, produce a control signal; and
   a rendering module adapted to:
      receive and process the control signal;
      receive a power consumption profile associated with each of the horticultural light sources; and send illumination instructions to the plurality of horticultural light sources to adjust an emission profile of the plurality of horticultural light sources, thereby mitigating potentially negative effects on said at least one plant or crop growth.

2. The system of claim 1, wherein the rendering module is further adapted to receive at least one lighting scenario.

3. The system of claim 1, wherein the emission profile comprises spectral properties of each of the horticultural light sources.

4. The system of claim 1, wherein the emission profile comprises intensity properties of each of the horticultural light sources.

5. The system of claim 1, wherein the emission profile comprises an on/off status of each of the horticultural light sources.

6. The system of claim 1, wherein the information associated with said at least one load shedding event is representative of an expected load shedding event.

7. The system of claim 6, wherein the control module is configured to determine a probability of the expected load shedding event.

8. The system of claim 1, wherein the information associated with said at least one load shedding event is further representative of a timing and a duration of the expected load shedding event.

9. The system of claim 1, wherein the control module is configured to produce a notification upon reception of the information associated with said at least one shedding event.

10. The system of claim 1, wherein the illumination instructions are based on at least one integral indicator.

11. The system of claim 1, wherein the illumination instructions cause one of: a gradual load flattening, an instantaneous, and an almost-instantaneous load flattening.

12. A method for managing horticultural load shedding, the method comprising:
   receiving information associated with at least one load shedding event from an electrical utility, the electrical utility being configured to power a plurality of horticultural light sources and,
   in response thereto, produce a control signal;
   receiving and processing the control signal;
   receiving a power consumption profile associated with each of the horticultural light sources; and
   sending illumination instructions to the plurality of horticultural light sources to adjust an emission profile of the plurality of horticultural light sources, thereby mitigating potentially negative effects on said at least one plant or crop growth.

13. The method of claim 12, wherein the emission profile comprises at least one of spectral properties of each of the horticultural light sources, intensity properties of each of the horticultural light sources and an on/off status of each of the horticultural light sources.

14. The method of claim 12, wherein the information associated with said at least one load shedding event is representative of an expected load shedding event.

15. The method of claim 14, wherein the information associated with said at least one load shedding event is further representative of a timing and a duration of the expected load shedding event.

16. The method of claim 15, further comprising determining a probability of the expected load shedding event.

17. The method of claim 12, wherein the illumination instructions are based on at least one integral indicator.

18. The method of claim 12, wherein the illumination instructions cause a gradual load flattening.

19. The method of claim 12, wherein the illumination instructions cause an instantaneous or an almost-instantaneous load flattening.

\* \* \* \* \*